UNITED STATES PATENT OFFICE.

ALBERT HERRMANN, OF HÖCHST-ON-THE-MAIN, GERMANY, ASSIGNOR TO THE FARBWERKE, VORMALS MEISTER, LUCIUS & BRÜNING, OF SAME PLACE.

FAST BLUE DYE.

SPECIFICATION forming part of Letters Patent No. 580,187, dated April 6, 1897.

Application filed January 14, 1897. Serial No. 619,218. (Specimens.)

*To all whom it may concern:*

Be it known that I, ALBERT HERRMANN, doctor of philosophy, a citizen of the German Empire, residing at Höchst-on-the-Main, Germany, have invented a new and useful Improvement in the Manufacture of a Blue Acid Dyestuff, of which the following is a specification.

This invention relates to the manufacture of a very valuable blue acid dyestuff which is a derivative of pentaälkyltriamidodiphenyl-orthotolylmethane having the following formula:

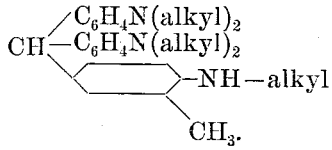

This dyestuff is obtained by the condensation of alkylated diamidobenzhydrol with the sulfonic acid of monomethyl or monoethyl-orthotoluidin and by the oxidation of the leucosulfonic acid thus obtained.

Twenty-seven kilograms of tetramethyldiamidobenzhydrol or the equivalent quantity of the ethyl compound are dissolved in thirty-five kilograms of hydrochloric acid containing thirty-one per cent. HCl and two hundred liters of water. To this solution are added 20.1 kilograms of monomethyl-orthotoluidin-monosulfonic acid or the equivalent quantity of the ethyl compound, and the thus-obtained solution is heated on the water-bath for from eight to ten hours until a sample proves to be free from hydrol. The solution is then neutralized with soda and the thus-obtained leuco salt, being the sulfonic acid of pentaälkyltriamidodiphenyl-orthotolylmethane, salted out and dried. Ten kilograms of this leuco salt are dissolved in three hundred liters of water, the solution heated to 60° to 70° centigrade, thoroughly stirred with the calculated quantity of acetic acid and lead peroxid, and then six kilograms of Glauber salt are added in order to precipitate the lead. The intensely-blue solution is filtered off from the sulfate of lead and the dyestuff is precipitated with common salt or the solution is evaporated.

The new dyestuff thus obtained, being the monosulfonic acid of pentaälkyltriamidodiphenyl-orthotolylcarbinol, is a copper-colored powder of metallic luster, easily soluble in water with a blue color and less soluble in alcohol. Ammonia and soda do not change the aqueous solution, which on being boiled with soda-lye produces alkylamin and turns violet. Treated with an excess of mineral acid the solution assumes a green color. The dyestuff dyes wool and silk blue in an acid-bath. The tints are very even and very fast to water, soap, air, and light.

Having thus described my invention, what I claim is—

1. The process herein described of producing a blue dyestuff, which consists in condensing tetraälkyldiamidobenzhydrol with monoalkyl-orthotoluidin sulfonic acid, and then oxidizing the thus-obtained sulfonic acid of pentaälkyltriamidodiphenyl-orthotolylmethane, substantially as set forth.

2. As a new product, the blue dyestuff, namely the monosulfonic acid of pentaälkyltriamidodiphenyl-orthotolylcarbinol, being a copper-red powder of metallic luster, easily soluble in water, less easily soluble in alcohol, its aqueous solution turning green with mineral acids and being not changed by ammonia or soda, turning violet when boiled with soda-lye, and dyeing wool and silk a very even and fast blue in an acid-bath, substantially as set forth.

In testimony that I claim the foregoing as my invention I have signed my name in presence of two subscribing witnesses.

ALBERT HERRMANN.

Witnesses:
   HEINRICH HAHN,
   ALFRED BRISBOIS.